US 11,050,259 B2

(12) United States Patent
Sugeno et al.

(10) Patent No.: US 11,050,259 B2
(45) Date of Patent: Jun. 29, 2021

(54) POWER SUPPLY DEVICE AND CONTROL DEVICE

(71) Applicant: MURATA MANUFACTURING CO., LTD., Kyoto (JP)

(72) Inventors: Naoyuki Sugeno, Kyoto (JP); Hiroaki Yoshida, Kyoto (JP); Atsushi Chinen, Kyoto (JP); Masami Okada, Kyoto (JP); Mohan Amit Saklani, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 107 days.

(21) Appl. No.: 15/983,910

(22) Filed: May 18, 2018

(65) Prior Publication Data

US 2018/0269685 A1    Sep. 20, 2018

Related U.S. Application Data

(63) Continuation of application No. PCT/JP2016/004994, filed on Nov. 29, 2016.

(30) Foreign Application Priority Data

Jan. 14, 2016  (JP) .............................. JP2016-005256

(51) Int. Cl.
*H02J 3/38* (2006.01)
*H02J 7/35* (2006.01)
(Continued)

(52) U.S. Cl.
CPC ................... *H02J 3/38* (2013.01);
*H02J 3/32* (2013.01); *H02J 3/383* (2013.01);
*H02J 5/00* (2013.01);
(Continued)

(58) Field of Classification Search
CPC ....... H02J 3/00; H02J 5/00; H02J 7/00; H02S 20/00; H02S 40/00; Y02B 10/00
(Continued)

(56) References Cited

U.S. PATENT DOCUMENTS

| 10,224,739 B2 * | 3/2019 | Kaag ..................... H05B 47/17 |
| 2007/0177338 A1 * | 8/2007 | Nishi ..................... H02J 3/383 |
| | | 361/641 |

(Continued)

FOREIGN PATENT DOCUMENTS

| CN | 103368241 | 10/2013 |
| EP | 2 648 304 | 10/2013 |

(Continued)

OTHER PUBLICATIONS

Extended European Search Report dated Apr. 29, 2019 in corresponding European Application No. 16884847.1.
(Continued)

*Primary Examiner* — Rexford N Barnie
*Assistant Examiner* — Joseph N Inge
(74) *Attorney, Agent, or Firm* — K&L Gates LLP (57) ABSTRACT

A power supply device includes a photovoltaic power generator, a secondary battery unit, a charger configured to supply power from the photovoltaic power generator to the secondary battery unit, a DC-AC power conversion circuit configured to convert a discharge output of the secondary battery unit into AC power, and a control device configured to control charging of the secondary battery unit based on a load power prediction obtained by a moving average of used power and an amount of power generated by the photovoltaic power generator and perform control to switch output of the amount of power generated by the photovoltaic power generator between the secondary battery unit and a commercial system power based on a value of state of charge (SOC) of the secondary battery unit.

7 Claims, 6 Drawing Sheets

(51) Int. Cl.
*H02J 3/32* (2006.01)
*H02S 20/30* (2014.01)
*H02S 40/32* (2014.01)
*H02J 5/00* (2016.01)

(52) U.S. Cl.
CPC ............... *H02J 7/35* (2013.01); *H02S 20/30* (2014.12); *H02S 40/32* (2014.12); *Y02B 10/70* (2013.01)

(58) Field of Classification Search
USPC .......................................................... 307/84
See application file for complete search history.

(56) References Cited

U.S. PATENT DOCUMENTS

| | | | |
|---|---|---|---|
| 2010/0174417 A1* | 7/2010 | Iida ..................... | H01M 10/425 700/292 |
| 2012/0173034 A1 | 7/2012 | Taima | |
| 2013/0049464 A1* | 2/2013 | Fumamoto ........... | H01M 10/44 307/24 |
| 2013/0088900 A1* | 4/2013 | Park ....................... | H02J 3/381 363/71 |
| 2013/0264865 A1* | 10/2013 | Sugeno .................. | B60L 53/51 307/9.1 |
| 2014/0012427 A1 | 1/2014 | Katayama et al. | |
| 2017/0102677 A1* | 4/2017 | Hidaka .................... | H02J 3/46 |

FOREIGN PATENT DOCUMENTS

| | | |
|---|---|---|
| JP | 2004-362787 | 12/2004 |
| JP | 2004-362787 A | 12/2004 |
| JP | 3172855 | 1/2012 |
| JP | 2013-233070 | 11/2013 |
| JP | 2013-233070 A | 11/2013 |
| WO | 2011/040470 | 4/2011 |
| WO | 2013/157481 A1 | 10/2013 |

OTHER PUBLICATIONS

Japanese Office Action dated Sep. 4, 2018 in corresponding Japanese Application No. 2017-561064.
International Search Report and Written Opinion issued in connection with International Patent Application No. PCT/JP2016/004994 dated Jan. 31, 2017. (10 pages).
Chinese Office Action dated Nov. 4, 2020 in corresponding Chinese Application No. 201680078046.2.
European Office Action dated Apr. 30, 2021 in corresponding European Application No. 16 884 847.1.
Xiaohu Liu, et al., Coordinated Control of Distributed Energy Storage System With Tap Changer Transformers for Voltage Rise Mitigation Under High Photovoltaic Penetration, LEEE Transactions on Smart Grid, vol. 3, No. 2, Jun. 2012.

* cited by examiner

POWER SUPPLY DEVICE AND CONTROL DEVICE

CROSS REFERENCE TO RELATED APPLICATIONS

The present application is a continuation of PCT patent application no. PCT/JP2016/004994, filed on Nov. 29, 2016, which claims priority to Japanese patent application no. JP2016-005256 filed on Jan. 14, 2016, the entire contents of which are being incorporated herein by reference.

BACKGROUND

The present technology generally relates to a power supply device and a control device, which supply power by using output power from an external power system and a solar battery and output power from a power storage device.

Recently, household power storage devices of larger capacities have been put into practical use. By utilizing a household power storage device, it is possible to secure the power supply at the time of power outage and to reduce the power demand amount and the power usage amount of an external power system.

For example, it is conceivable to reduce the supply of AC power from an external power system and to compensate insufficient power by a power storage device. In addition, as the household power demand increases to exceed the contracted electric power with an electric power supplier, the breaker may operate to cut off the electric power. In such a case, by supplying output power from the power storage device, it is possible to avoid situations that exceed the contracted electric power.

Further, it has been considered that solar battery output and output power of a power storage device are mixed and output.

SUMMARY

The present technology generally relates to a power supply device and a control device. It is desirable that power is output from a secondary battery to a load with a constant output power amount in the use of the secondary battery. This is because battery deterioration is caused by sudden fluctuations in the output of the secondary battery. For example, when a load is applied to the secondary battery so as to cause an output value uncertainty state in which a 0 W output occurs immediately after a sudden maximum output value, the secondary battery suddenly generates heat due to the output of a large current and then deteriorates. Because it takes several tens of minutes to reach the balanced equilibrium state of lithium in the electrode, rapid charging/discharging causes an imbalanced state of lithium ions in the electrode of the battery, and the next charging/discharging will further accelerate the imbalance.

If power prediction can be performed, it is possible to output power from the secondary battery at a constant value and reduce the amount of fluctuations in the secondary battery by correcting an output amount corresponding to only the amount of power deviating from the prediction, thereby allowing an operation with less deterioration in the battery. This makes it possible to prevent sudden deterioration of capacity of the secondary battery and to improve reliability in long-term operation.

According to an embodiment, the present technology provides a power supply device and a control device, which can prevent sudden fluctuations in the output of the secondary battery unit and deterioration of the secondary battery unit, and can supply output power from the secondary battery unit while keeping the SOC of the secondary battery unit within an appropriate range by increasing accuracy concerning power demand.

According to an embodiment of the present technology, a power supply device is provided. The power supply device includes a photovoltaic power generator, a secondary battery unit, a charger configured to supply power from the photovoltaic power generator to the secondary battery unit, a DC-AC power conversion circuit configured to convert a discharge output of the secondary battery unit into AC power, and a control device configured to control charging of the secondary battery unit based on a load power prediction obtained by a moving average of used power and an amount of power generated by the photovoltaic power generator, and perform control to switch output of the amount of power generated by the photovoltaic power generator between the secondary battery unit and a commercial system power based on a value of state of charge (SOC) of the secondary battery unit.

According to another embodiment of the present technology, a control device including a processor configured to control charging of the secondary battery unit based on a load power prediction obtained by a moving average of used power and an amount of power generated by the photovoltaic power generator, and perform control to switch output of the amount of power generated by the photovoltaic power generator between the secondary battery unit and a commercial system power based on a value of state of charge (SOC) of the secondary battery unit.

According to at least one embodiment, the present technology controls the output of the secondary battery unit by load power prediction, and hence can prevent deterioration of the secondary battery unit by preventing sudden fluctuations in the output of the secondary battery unit. In addition, in an embodiment of the present technology, by mixing the external power system with the output power of the power storage device, it is possible to absorb the sudden fluctuation in the local (indoor) load and to make the use of the external power system substantially constant.

As a result, it is possible to lower the contracted electric power and to suppress an increase in power rates. It should be understood that each effect described herein is not necessarily limited and may be any of the effects described in the present technology.

DETAILED DESCRIPTION

The present technology generally relates to a power supply device and a control device. The present disclosure will be described based on examples or embodiments with reference to the drawings, but the present disclosure is not to be considered limited to the examples, and various numerical values and materials in the examples are considered by way of example.

Figure 1:
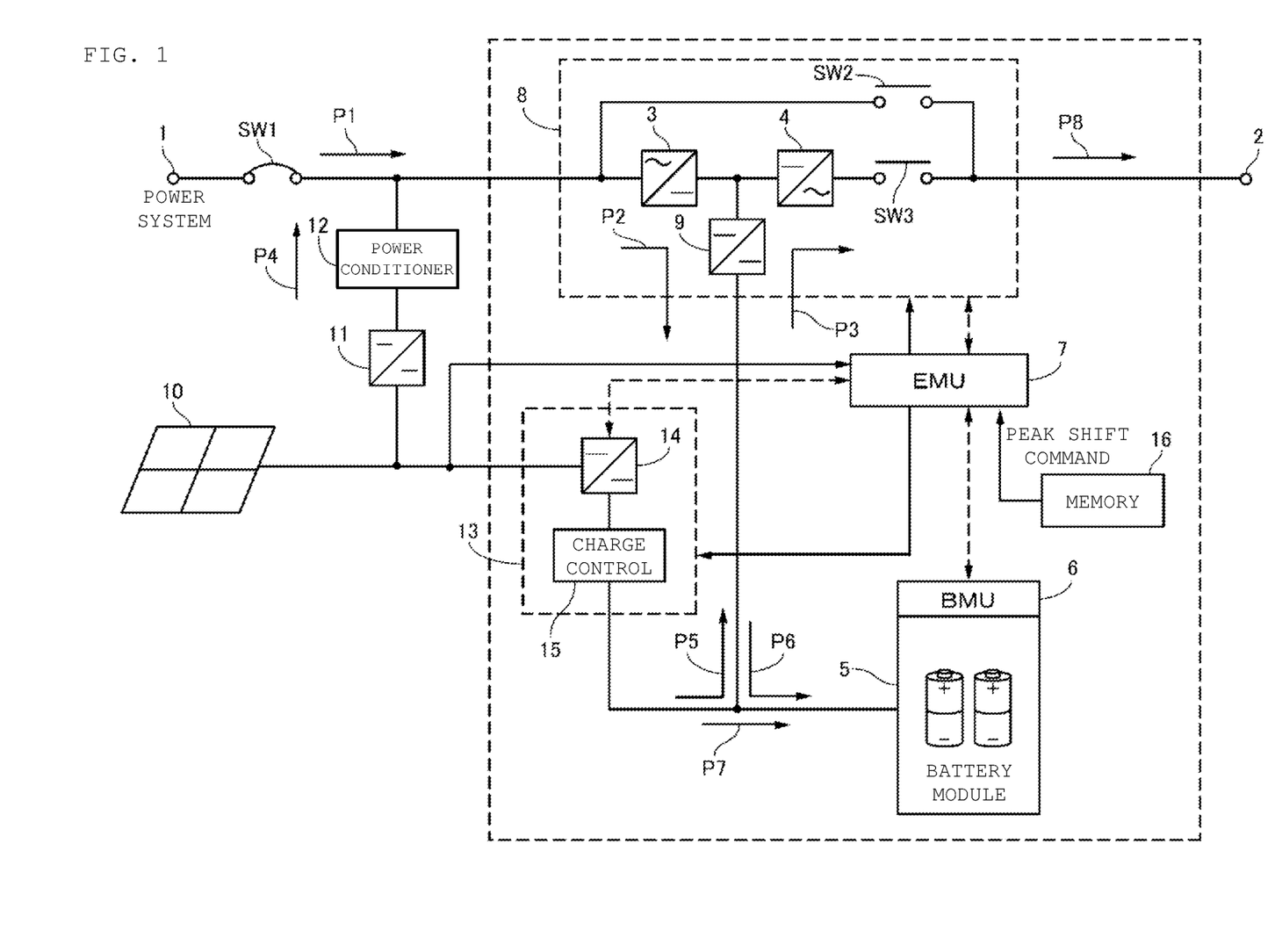
FIG. 1 is a block diagram of a power supply device according to an embodiment of the present technology.

A power supply device according to an embodiment of the present technology will be described with reference to FIG. 1. The power generated by a power plant of an electric power supplier is supplied to the household electricity meter via a power transmission network and an electric distribution network (not shown), and AC power is supplied from the electricity meter to an external power system (commercial power) input terminal 1 in FIG. 1. Although power control at home will be described, the present technology can be applied to not only homes but also areas that are partitioned in terms of power supply, including a plurality of houses (communities), buildings, and factories.

Generally, a power line is introduced from an outdoor distribution line through a leading-wire into a building, and the power line is connected to the power meter. The distribution board is connected to the output side of the power meter. An electronic device is connected to the indoor wiring from the distribution board. For example, a power supply device according to the present technology is provided between a power meter and a distribution board. A typical house uses a single-phase three-wire system having a total of three electric wires including a central neutral wire and two voltage wires. A voltage of 100 V can be utilized by using the neutral wire and one voltage line, and a voltage of 200 V can be utilized by utilizing two voltage lines. It should be understood that the present technology can also be applied to a two-wire system according to an embodiment.

Commercial power from the input terminal 1 is supplied and input to an uninterruptible power supply (UPS) unit 8 indicated by being surrounded by a broken line via a switch SW1. The UPS unit 8 has an alternating current (AC)-direct current (DC) converter 3, a DC-AC inverter 4, a switch SW2, and a switch SW3. Commercial power P1 is supplied to the UPS unit 8. The AC-DC converter 3 forms DC power from commercial power. The output DC power from the AC-DC converter 3 is supplied to the DC-AC inverter 4. The DC-AC inverter 4 forms AC power of the same level and frequency as the commercial power. The output AC power from the DC-AC inverter 4 is taken out to an AC power supply terminal 2 via the switch SW3. The switches SW1, SW2, and SW3 are ON/OFF-controlled by control signals.

The commercial power is supplied to the AC power supply terminal 2 via the switches SW1 and SW2. The switch SW1 sometimes serves as a circuit breaker of the distribution board. An indoor power network is connected to the AC power supply terminal 2. For example, although not shown, the AC power is supplied to a switch board (including a distribution board), and electric power is supplied to each electronic device of an electronic device group via a power line and a plug extending from the switchboard. Examples of electronic device groups are air conditioners, refrigerators, lighting fixtures, washing machines, television receivers, and the like. The power used by the device connected to the indoor power network is the load power.

A DC-DC converter 9 is connected between the connection point between the output of the AC-CD converter 3 and the input of the DC-AC inverter 4 and a secondary battery unit, for example, a battery module 5. The DC-DC converter 9 is bidirectional. That is, DC power P2 formed from the commercial power is supplied from the AC-DC converter 3 to the battery module 5 as charging power via the DC-DC converter 9. On the other hand, discharge power P3 from the battery module 5 is supplied to the DC-DC converter 9, the output of the DC-DC converter 9 is supplied to the DC-AC inverter 4, and AC power is taken out from the DC-AC inverter 4 to the AC power supply terminal 2 via the switch SW3. These parts, namely, the AC-DC converter 3, the DC-AC inverter 4, the DC-DC converter 9, the switch SW2, and the switch SW3 constitute the UPS unit 8.

As the battery module 5, for example, it is possible to use a configuration in which eight cylindrical lithium ion secondary batteries are connected in parallel to constitute a battery block, and 16 battery blocks are connected in series and accommodated in a common case. Another example of the battery module 5 is an electric double layer or a large capacity capacitor. Note that the battery module 5 is not limited to a stationary type but may be one used in an electrically powered vehicle.

A solar battery module 10 is installed on a roof, outdoor, or the like. The solar battery module 10 is formed by connecting a plurality of solar batteries to form a panel. It is also called a solar panel. Usually, a plurality of solar battery modules 10 are arranged side by side to constitute a solar battery array. For example, the solar battery module 10 can generate power of 2 kW to 4 kW.

Output power P4 from the solar battery module 10 is supplied to the power supply line of the external power system via a DC-DC converter 11 and a power conditioner 12. The power conditioner 12 has a power conversion unit including a DC-DC converter unit and a DC-AC inverter unit. The DC-DC converter unit boosts the input DC voltage and supplies the DC voltage to the DC-AC inverter unit. The DC-AC inverter unit converts the DC voltage from the DC-DC converter unit into AC power. Further, the power conditioner 12 performs control called maximum power point tracking (MPPT). This control follows fluctuations in the power generated by the solar battery module 10 and always follows the maximum power point.

Because the output of the power conditioner 12 is connected to the power supply line of the external power system, when the power generated by the solar battery module 10 exceeds the domestic power consumption, the surplus power is sold. Selling surplus power is called reverse power flow. Although not shown, a meter for measuring power in a reverse power flow is connected. In the UPS unit 8, the power generated by the solar battery module 10 and output power from the battery module 5 are mixed and supplied to a house load.

Furthermore, output power from the solar battery module 10 is supplied to a PV charger 13. The PV charger 13 has a DC-DC converter 14 to which output power from the solar battery module 10 is supplied and a charge control unit 15. Output power P5 from the charge control unit 15 is supplied to the UPS unit 8 and used as load power P8. At the same time, output power P6 from the charge control unit 15 is supplied to the battery module 5. The above-described DC-DC converter 9 of the UPS unit 8 is connected to the battery module 5, and the battery module 5 is charged by one of the output of the solar battery module 10 via the charge control unit 15 and the commercial power P7 from the UPS unit 8.

In charging the battery module 5 with commercial power, a rated current is set as a charging current. At the time of charging from the solar battery module 10, the charge control unit 15 forms a charging current corresponding to the SOC of the battery module 5. For example, when the SOC is 50% or less, a charging current of 1 C is formed. When the SOC is 80% to 90%, a charging current of 0.5 C is formed. When the SOC is more than 90%, a charging current of 0.2 C is formed.

For example, according to an embodiment, the battery module 5 is configured by a lithium ion storage battery, and is charged with constant current (CC)/constant voltage (CV) during charging. That is, initially, the battery module is charged with a predetermined current, and the charging of the battery module is switched to constant voltage charging when the battery module is charged to a predetermined voltage. Charge control by the PV charger 13 performs processing of controlling the value of the charging current.

Charging control for the battery module 5 is performed by an energy management unit (EMU) 7 communicating with a battery management unit (BMU) 6. The BMU 6 monitors the state (the remaining capacity, battery voltage, battery temperature, and the like) of the battery module 5 so as to perform an appropriate charging and discharging operation. Information on the remaining capacity of the battery module 5 acquired by the BMU 6 is transmitted to the EMU 7 and used for switching the operation mode of the EMU 7. The EMU 7 controls the switch of the UPS unit 8 and controls the AC-DC converter 3 and the DC-AC inverter 4. The EMU 7 monitors output power from the solar battery module 10. If output power from the solar battery module 10 is equal to or larger than a predetermined value, the battery module 5 is charged with the output of the PV charger 13. Therefore, during the daytime or the like, the battery module 5 is charged by the solar battery module 10. In this example, although the BMU 6 and the EMU 7 are described as discrete components, they may be integrally implemented by a single microcomputer or the like.

Load power prediction data in the indoor environment which is acquired in advance is stored in a memory 16 connected to the EMU 7. The prediction data of the total power of load power, that is, the indoor power consumption, is supplied to the EMU 7, and the EMU 7 controls the entire system. As one example, the load power prediction data shows the load power prediction data at each time point set by dividing one day (24 hr) in units of 30 min.

In the embodiment as described herein, power is controlled in accordance with the power generation amount of the solar battery module 10, the power storage amount of the battery module 5, and the load power prediction data. Further, the respective types of power are mixed and output as necessary. Table 1 given below shows an example of a control operation in one embodiment of the present technology.

TABLE 1

| Contracted household capacity: 40 A | Maximum | Secondary battery SOC % | | | | | |
|---|---|---|---|---|---|---|---|
| | PV power | 0 TO 20% | | 20 TO 80% | | 80 TO 100% | |
| PV design capacity: 3.5 kW | generation amount | PV control | Secondary battery | PV control | Secondary battery | PV control | Secondary battery |
| Load prediction value: 2 kW TO 3 kW | PV2 TO 3 kW | Output/charge | Charge | Output/charge | Charge/discharge | Output | Discharge |
| | PV1 TO 2 kW | Output | Stop | Output/charge | Discharge | Output | Discharge |
| | PV0 TO 1 kW | Output | Stop | Output | Discharge | Output | Discharge |
| Load prediction value: 1 kW TO 2 kW | PV2 TO 3 kW | Output/charge | Charge | Output/charge | Charge | Output limitation | Stop |
| | PV 1 TO 2 kW | Output/charge | Stop | Output/charge | Charge/discharge | Output | Discharge |
| | PV0 TO 1 kW | Output | Stop | Output | Discharge | Output | Discharge |
| Load prediction value: 0 kW TO 1 kW | PV2 TO 3 kW | Output/charge | Charge | Output/charge | Charge | Output limitation | Stop |
| | PV1 TO 2 kW | Output/charge | Charge | Output/charge | Charge | Output limitation | Stop |
| | PV0 TO 1 kW | Output/charge | Stop | Output/charge | Charge/discharge | Output | Discharge |

Figure 2:
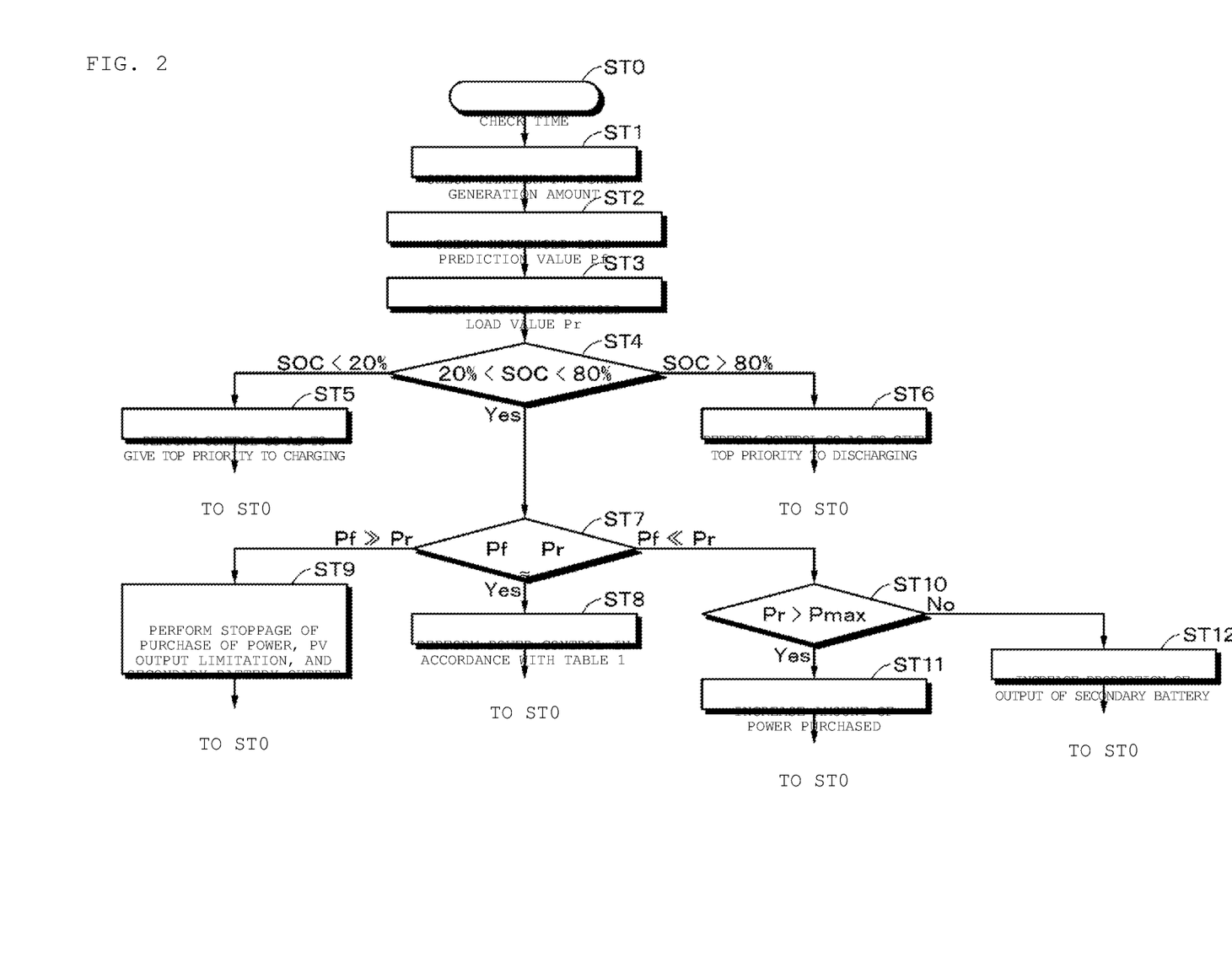
FIG. 2 is a flowchart for explaining control processing according to an embodiment of the present technology.

The EMU 7 controls the system as shown in the flowchart of FIG. 2 in accordance with Table 1. Although not shown in Table 1 and FIG. 2, when the switches SW1 and SW2 are turned on, input commercial power is taken out to the AC power supply terminal 2 without any change. This bypass operation is performed when any abnormality is detected. A maintenance bypass mode for maintenance such as replacement of the battery module and inspection of the fan is also possible. In Table 1 and FIG. 2 and the following description, the battery module 5 is indicated as a secondary battery as needed, and the solar battery module 10 is indicated as PV as needed.

Step ST0: The time is checked.

Step ST1: The maximum PV power generation amount is checked.

Step ST2: A household load prediction value Pf is checked by referring to the load power prediction data.

Step ST3: An actual household load value Pr which is the value of the current load power in the home is checked.

Step ST4: The SOC of the secondary battery is determined. That is, it is determined whether the SOC is small, for example, (SOC<20%), the SOC is in a proper range, for example, (20%<SOC<80%), or the SOC is large, for example, (SOC>80%).

Step ST5: If (SOC<20%), control is performed so as to give top priority to the charging of the secondary battery. Then, the process returns to step ST0 to perform processing in (steps ST1 to ST4).

More specifically, as shown in the item (SOC=0% to 20%) in Table 1, it is basically assumed that the secondary battery can only be charged. In Table 1, "output/charge" means that PV generated power is output to the power supply line and used for charging the secondary battery.

Step ST6: If (SOC<80%), control is performed so as to give top priority to discharging of the secondary battery. Then, the process returns to step ST0 to perform processing in (steps ST1 to ST4).

More specifically, as indicated by the item (SOC=80% to 100%) in Table 1, the discharging of the secondary battery is mainly performed. However, as an exception, in the evening, the SOC of the secondary battery is raised to near 100%. This is a case in which power is supplied to the household load by utilizing power from the secondary battery at night. At this time, in order to charge the secondary battery only when PV power generation is performed in the evening, the output of the PV charger 13 is restricted, and the operation of charging the secondary battery to near SOC 100% is performed. That is, conditions that allow the secondary battery to be easily charged to full capacity upon throttling the charging current are set. This is because, in an ordinary MPPT operation, it takes about 2 hr to charge the secondary battery by an ON-OFF operation. Further, in a state in which the PV generation amount is smaller than the load power, the output from the secondary battery is supplied to the load power.

Step ST7: If (20%<SOC<80%), it is determined whether the household load prediction value Pf and the actual household load value Pr are nearly equal. That is, it is determined whether the actual household power consumption is close to the predicted value.

Step ST8: When Pf and Pr are nearly equal, power control is performed according to Table 1. Then, the process returns to step ST0 to perform processing in (steps ST1 to ST4). As shown in the column of (SOC of (20%) to (80%) in Table 1, when ((maximum PV power generation amount>load power amount)), power is supplied to the load and the secondary battery is charged. For example, this control is performed in a fine weather.

Further, in the case of (maximum PV generation amount-≈load power amount), power is supplied to the load and the secondary battery is charged or discharged. For example, in a cloudy weather, frequent switching occurs between charging the secondary battery and discharging the secondary battery. Furthermore, in the case of (maximum PV power generation amount<load power amount), the secondary battery switches from a charging operation to a discharging operation. For example, in a rainy weather, PV power generation becomes insufficient, and hence discharging of the secondary battery is performed. The discharging (outputting) of the secondary battery is performed up to an SOC of 20%.

Step ST9: In step ST7, if it is determined that the household load prediction value Pf greatly exceeds the actual household load value Pr, that is, if the actual household load greatly deviates from the predicted value and becomes light, the stoppage of the purchase of system power, PV output limitation, and secondary battery output are performed. This makes it possible to stop the purchase of system commercial power while supplying power only from the secondary battery.

Step ST10: If it is determined in step ST7 that the actual household load value Pr greatly exceeds the household load prediction value Pf, that is, when the actual household load greatly deviates from the prediction value and becomes heavy, it is determined whether the actual household load value Pr exceeds the maximum output Pmax of the secondary battery.

Step ST11: In step ST10, if it is determined that the actual household load value Pr exceeds the maximum output Pmax of the secondary battery, the purchase amount of system commercial power is increased and supplied to the load. Then, the process returns to step ST0 to perform processing in (steps ST1 to ST4).

Step ST12: In step ST10, if it is determined that the actual household load value Pr does not exceed the maximum output Pmax of the secondary battery, the proportion of the output power of the secondary battery is increased. Then, the process returns to step ST0 to perform processing in (steps ST1 to ST4).

The battery module can supply power to be used in the home by optimally using the SOC (20% to 80%) range, reduce the purchase amount of power and reduce the electricity rate. Power outside this range of SOC is used for emergency use. It is desirable that power is output from a secondary battery to a load with a constant output power amount in the use of the secondary battery. This is because battery deterioration is caused by sudden fluctuations in the output of the secondary battery. For example, when a load is applied to the secondary battery so as to cause an output value uncertainty state in which a 0 W output occurs immediately after a sudden maximum output value, the secondary battery suddenly generates heat due to the output of a large current and then deteriorates. Because it takes several tens of minutes to reach the balanced equilibrium state of lithium in the electrode, rapid charging/discharging causes an imbalanced state of lithium ions in the electrode of the battery, and the next charging/discharging will further accelerate the imbalance.

In the present technology, by performing power prediction, it is possible to output power from the secondary battery at a constant value and reduce the amount of fluctuations in the secondary battery by correcting an output amount corresponding to only the amount of power deviating from the prediction, thereby allowing an operation with less deterioration in the battery. This makes it possible to prevent sudden deterioration of capacity of the secondary battery and to improve reliability in long-term operation.

According to an embodiment, the generation of the load power prediction data will be described. As a method of predicting a power consumption amount, moving average is used to further improve the accuracy. There are three main types of moving average: simple moving average, weighted moving average, and exponential moving average. As an example, simple moving average (SMA) without data weighting is used as a method of predicting a power consumption amount.

For example, a period of 2 weeks (14 days) is used as the moving average period. The following equation shows the simple moving average of the integral power during the most recent 14 days in a certain time zone (30 min). In order to obtain the simple moving average of the next day, the oldest integral power should be removed.

$$SMA_{30}=(PM+PM_{-1}+\ldots+PM_{-13})/14$$

$SMA_{30}$: Integral power average for 30 min; unit: Wh

Figure 3:
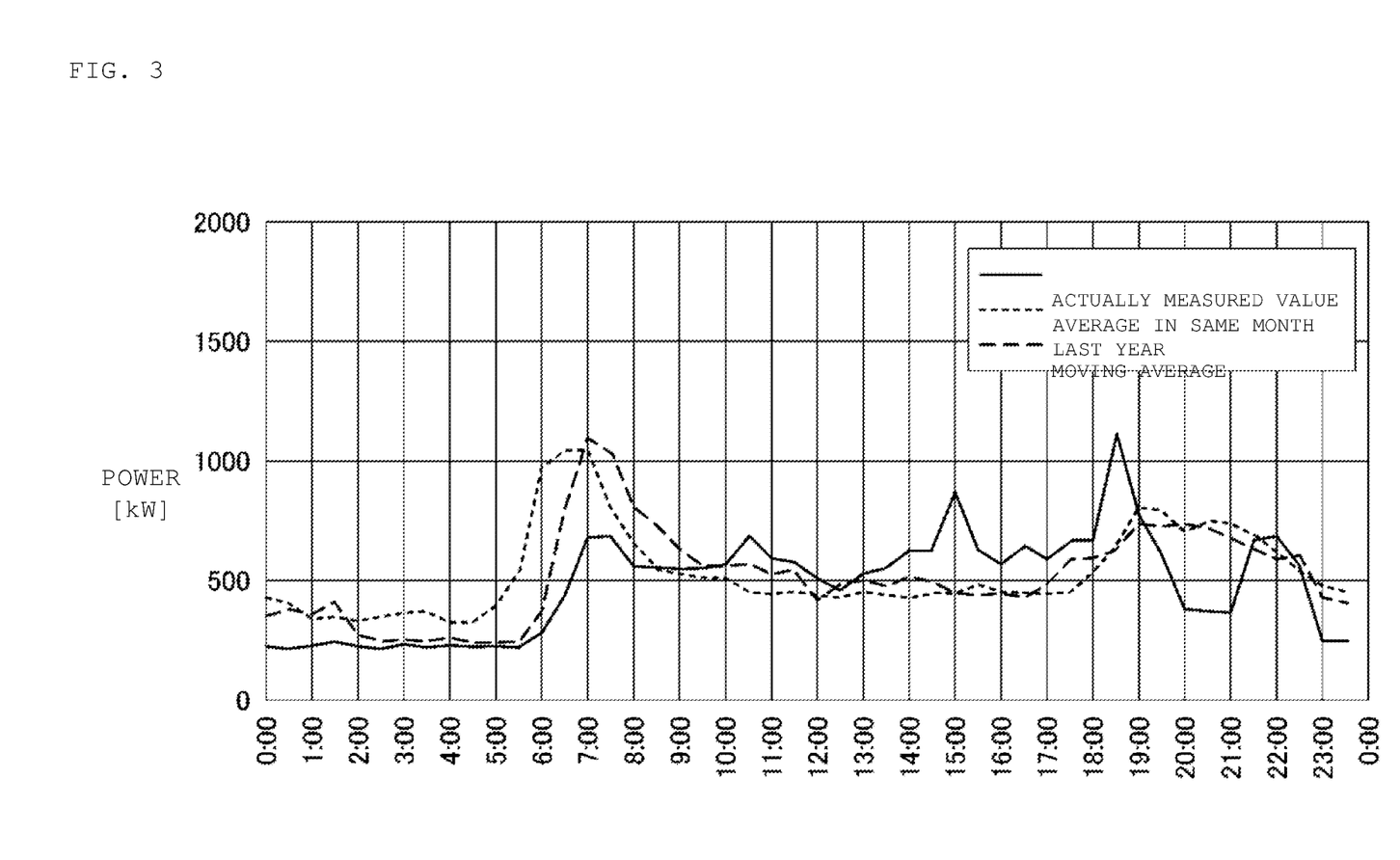
FIG. 3 is a graph used for explaining load power prediction data according to an embodiment of the present technology.

PM: integral power for 30 min in a certain time zone on the previous day $PM_{-1}$: integral power for 30 min in a certain time zone two days ago $PM_{-13}$: integral power for 30 min in a certain time zone two weeks ago FIG. 3 shows an example of measurement of load power. For example, it shows the actual measured valued (solid line) of household power consumptions on Apr. 1, 2014, the average power value (dotted line) in April of the previous year, and the moving average value (dashed line) for two weeks before April 1. As shown in the graph of FIG. 3, the moving average value is closer to the actual measured value than the average value in April of the previous year. In this manner, the prediction accuracy of the household load power can be improved. That is, such household load power prediction can be regarded as a time average of power consumption amount in the home, and can almost approximate human behavior. The prediction accuracy is high when there are no consecutive leave or rapid weather changes. Furthermore, a relatively accurate predicted value of a photovoltaic power generation amount can be obtained based on the weather forecast of the previous day, and hence it can almost approximate to the prediction.

According to an embodiment of the present technology described herein, it is possible to manage the secondary battery capacity, household load power amount, PV power generation amount, and system power purchase amount can be easily managed with a small control device. Even at the time of sudden fluctuations, an output can be corrected in accordance with SOC.

According to an embodiment of the present technology, in a fine or cloudy weather, for example, PV generated power is sold to a commercial power supplier from 11 o'clock to 13 o'clock, and a household power consumption in other time zones can be almost accurately predicted by operationally supplying household load power based on the predicted amount obtained by a moving average formula while maximally storing a PV power generation capacity in the secondary battery, thereby charging the secondary battery and accurately obtaining the SOC value of the battery. By predicting the sum of power from the secondary battery, power generated by PV power generation, and a household load, it is possible to set the power sale time zone for system power during a day time zone, and minimize the amount of purchased power.

Another embodiment of the present technology will be described. Regarding the payment of a power charge to the electric power company, contracted electric power is stipulated. As one way of determining contracted electric power, the maximum demand electric power in the past year including the current month is determined as contracted electric power. Another way to determine contracted electric power is through consultation. Also in this case, when the maximum demand electric power becomes higher than the contracted electric power set in advance, in addition to necessity to pay the excess charge, the contracted electric power of the next time (for example, the following year) may increase.

As the contracted electric power increases, the electricity rate increases, and hence it is necessary to pay attention so that the maximum demand electric power will not exceed the contracted electric power already decided. In the operation method of the power storage system, when the load power suddenly increases, power is supplied by increasing the amount of power purchased from the commercial power. However, if power is supplied in the vicinity of the upper limit value of the contracted electric power, the maximum demand electric power will exceed the contracted electric power, which will increase the contracted electric power of the next time. This makes it impossible to obtain a power reduction effect that should be obtained by power leveling upon introduction of the secondary battery system.

Figure 4:
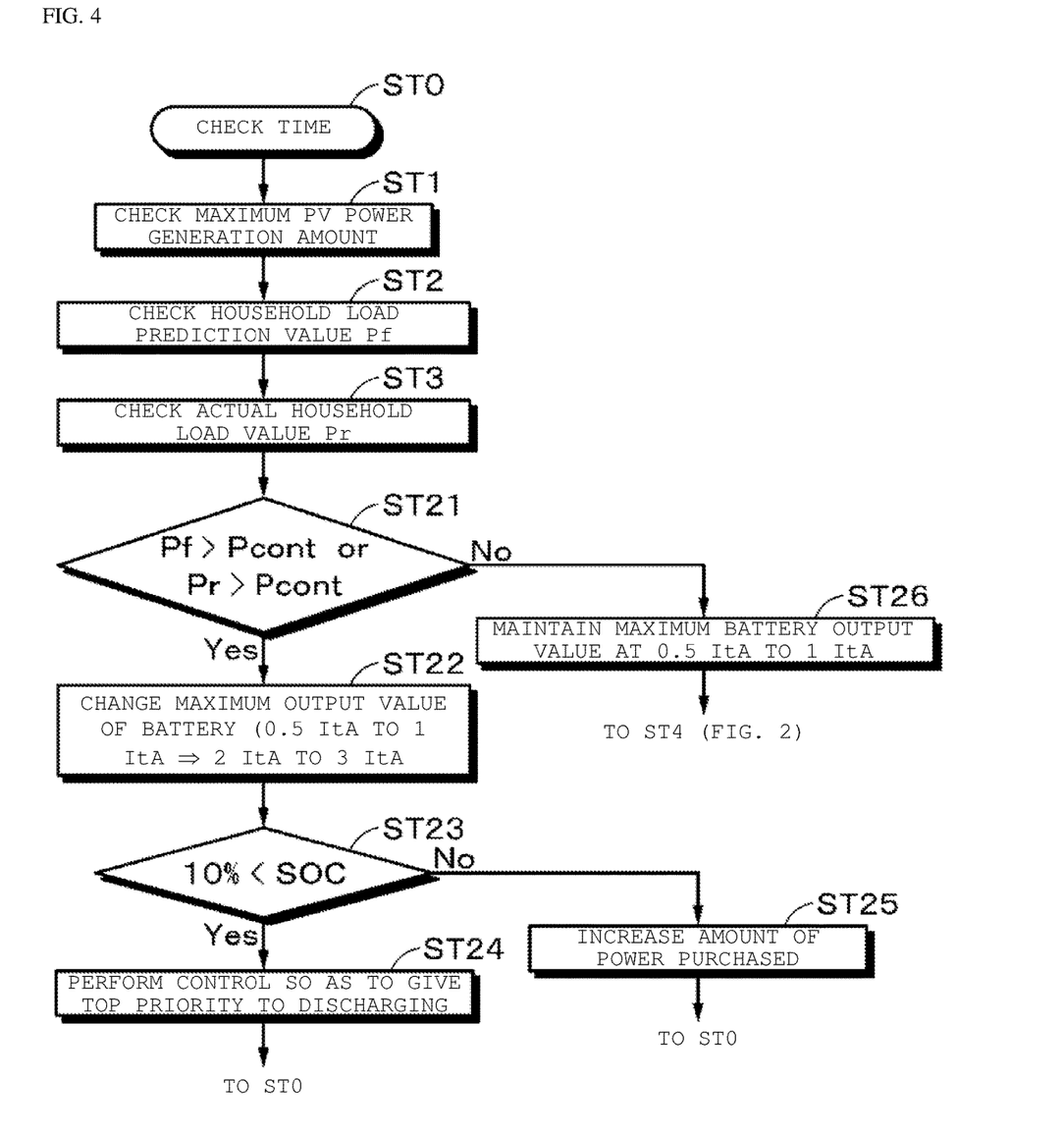
FIG. 4 is a flowchart for explaining control processing according to another embodiment of the present technology.

Therefore, in another embodiment, when a sudden increase in load power occurs in the vicinity of the upper limit value of the contracted electric power, the amount of power supplied from the secondary battery can be supplied at the upper limit output of the battery module. Another embodiment will be described with reference to FIG. 4. Another embodiment is an example combined with the above-described embodiment, and the processing of the flowchart of FIG. 4 is inserted between step ST3 and step ST4 of the flowchart of FIG. 2.

Step ST0: The time is checked.
Step ST1: The maximum PV power generation amount is checked.
Step ST2: A household load prediction value Pf is checked by referring to the load power prediction data.
Step ST3: An actual household load value Pr which is the value of the current load power in the home is checked.

The processing so far is the same as that in steps ST0 to ST3 in the embodiment.

Step ST21: It is determined whether (Pf>Pcont) or (Pr>Pcont). Pcont is a power value slightly lower than the upper limit value of the contracted electric power. For example, (Pcont=upper limit value of contracted electric power−5% of contracted electric power) is set.

Step ST22: If the determination is YES in step ST21, the maximum output value of the battery is changed to a larger value. That is, even during a normal power leveling operation, when it is predicted that the predicted integral power amount for 30 min will exceed the contracted electric power value, an emergency battery output command is issued to change the secondary battery output value to the output value at the battery module maximum output (2 ItA to 3 ItA) upon canceling the system limit value (usually 0.5 ItA to 1 ItA).

Step ST23: It is determined whether (SOC<10%). The assumed SOC is 30% to 50%. The threshold value for determination processing may be 30%, for example.

Step ST24: If YES in step ST23, control is performed so as to give top priority to discharging of the secondary battery. The process then returns to step ST0.

Step ST25: If NO in step ST23, the amount of purchased power is increased. The process then returns to step ST0.

Step ST26: If the determination is NO in step ST21, that is, if it is predicted that the predicted integral power amount for 30 min does not exceed the contracted electric power value, the secondary battery output value is maintained at the system limit value (usually 0.5 ItA to 1 ItA). The process then returns to step ST4 (see FIG. 2). Processing other than that described above is the same as in the embodiment.

Conventionally, it is not assumed that the output power amount exceeding the set upper limit value of the power storage system is implemented, and such an output power amount has not been set in the control device. In another embodiment of the present technology described above, it is possible to output the upper limit value of the battery module for a short time by setting the emergency output function. The temperature rise of a secondary battery system can be restricted to about 1° C. to 2° C. rise with respect to the normal operation because the remaining capacitance is discharged. This makes it possible perform the above operation within the range in which no influence is exerted on the system service life. Especially in business facilities and factories, it is possible to receive power supply without receiving any penalties from electric power companies by observing the contracted electric power amount. This makes it possible to receive advantages in both power leveling and power rate by introducing the power storage system.

Figure 5:
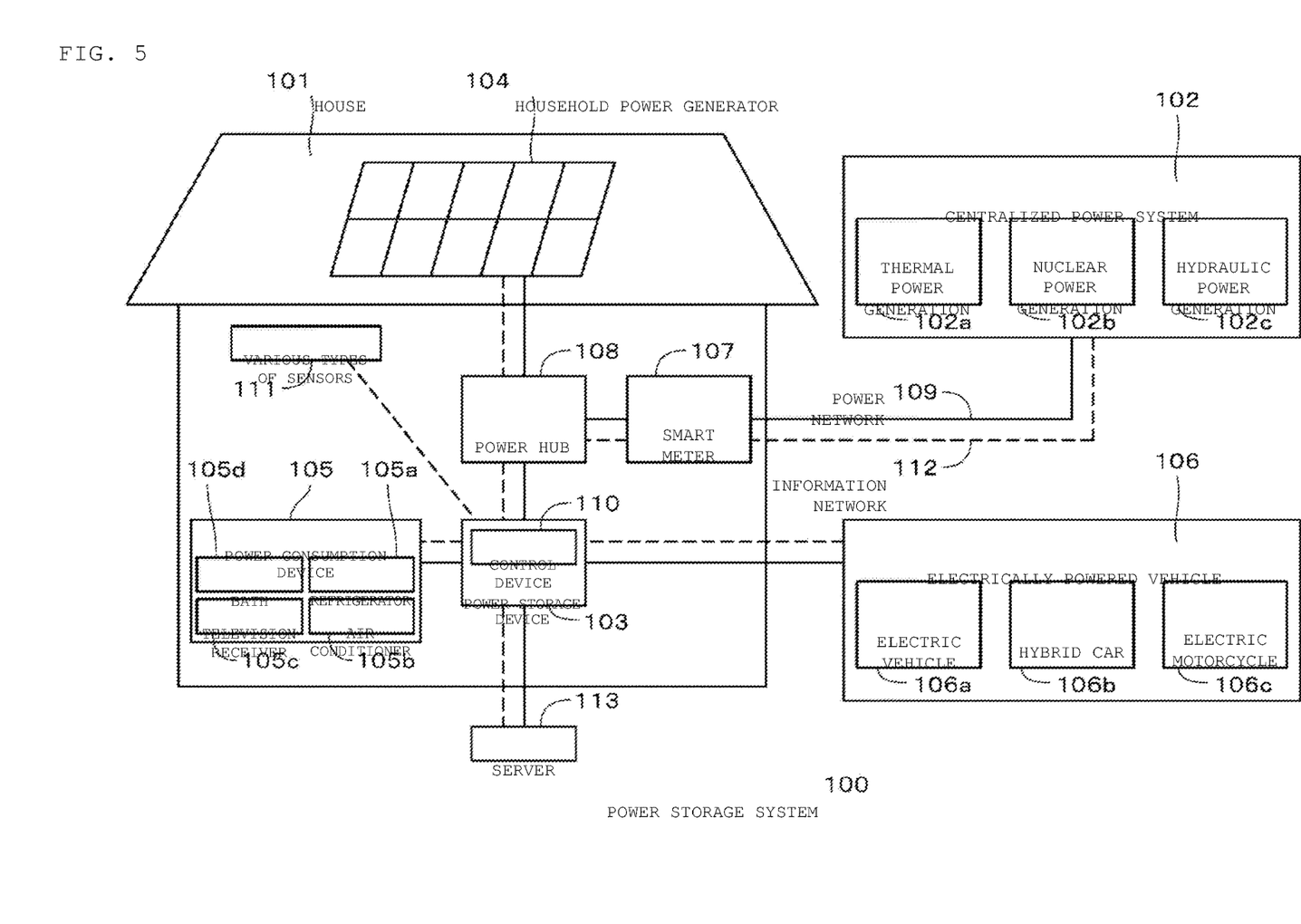
FIG. 5 is a block diagram of an application example of the power supply device according to an embodiment of the present technology.

An example according to an embodiment of the present technology is applied to a power storage system for a house will be described with reference to FIG. 5. For example, in a power storage system 100 for a house 101, power is supplied to a power storage device 103 from a centralized power system 102 such as thermal power generation 102a, nuclear power generation 102b, or hydraulic power generation 102c via a power network 109, an information network 112, a smart meter 107, a power hub 108, and the like. At the same time, electric power is supplied from an independent power supply such as a household power generator 104 to the power storage device 103. The power supplied to the power storage device 103 is stored. Power to be used in the house 101 is supplied using the power storage device 103. A similar power storage system can be used not only for the house 101 but also for a building.

The house 101 is provided with the power generator 104, a power consumption device 105, a power storage device 103, a control device 110 including a processor for controlling each device, a smart meter 107, and sensors 111 for acquiring various types of information. The respective devices are connected via a power network 109 and an information network 112. A solar battery, a fuel cell, or the like is used as the power generator 104, and the generated power is supplied to the power consumption device 105 and/or the power storage device 103. The power consumption device 105 includes a refrigerator 105a, an air conditioner 105b, a television receiver 105c, and a bath 105d. Furthermore, the power consumption device 105 includes an electrically powered vehicle 106. The electrically powered vehicle 106 includes an electric vehicle 106a, a hybrid car 106b, and an electric motorcycle 106c.

The power storage device 103 is configured by a storage battery or a capacitor. For example, the power storage device 103 is configured by a lithium-ion battery. The lithium ion battery may be stationary or may be used in the electrically powered vehicle 106. The smart meter 107 has a function of measuring the usage amount of commercial power and transmitting the measured usage amount to the electric power company. The power network 109 may use any one or a combination of DC power feed, AC power feed, and non-contact power feed. The present technology can be applied to a power supply device including the power storage device 103 and the control device 110.

The various sensors 111 include, for example, a human sensor, an illuminance sensor, an object detection sensor, a power consumption sensor, a vibration sensor, a contact sensor, a temperature sensor, and an infrared sensor. The information acquired by the various sensors 111 is transmitted to the control device 110. Based on the information from the sensors 111, the control device 110 can grasp the state of the weather, the state of a person and the like and minimize energy consumption by automatically controlling the power consumption device 105. Further, the control device 110 can transmit information on the house 101 to an external electric power company or the like via the Internet.

The power hub 108 performs processing such as branching of power lines and DC-AC conversion. Communication methods of the information network 112 connected to the control device 110 include a method using a communication interface such as a universal asynchronous receiver-transmitter (UART) and a method using a sensor network based on a wireless communication standard such as Bluetooth (registered trademark), ZigBee, or Wi-Fi. The Bluetooth (registered trademark) system is applied to multimedia communication and can perform one-to-many connection communication. ZigBee uses the physical layer of the institute of electrical and electronics engineers (IEEE) 802.15.4. IEEE 802.15.4 is the name of a short-range wireless network standard called personal area network (PAN) or wireless (W) PAN.

The control device 110 is connected to an external server 113. The server 113 may be managed by any of the house 101, an electric power company, and a service provider. The information transmitted and received by the server 113 includes, for example, power consumption information, life pattern information, power rate, weather information, natural disaster information, and power trade information. These pieces of information may be transmitted and received from a power consuming device (for example, a television receiver) in the home, but may be transmitted and received from a device outside the home (for example, a cellular phone). These pieces of information may be displayed on a device having a display function, for example, a television receiver, a cellular phone, or personal digital assistants (PDA).

The control device 110 that controls each unit is configured by a central processing unit (CPU), a random access memory (RAM), a read only memory (ROM), and the like, and is accommodated in the power storage device 103 in this example. The control device 110 is connected to the power storage device 103, the household power generator 104, the power consumption device 105, the various types of sensors 111, and the server 113 via the information network 112, and has, for example, a function of adjusting the usage amount of commercial power and the power generation amount. In addition, the control device 110 may have, for example, a function of conducting power trading on the power market.

As described herein, the power storage device 103 can store not only the power generated by the centralized power system 102 such as the thermal power generation 102a, the nuclear power generation 102b, or the hydraulic power generation 102c, but also the power generated by the household power generator 104 (solar power generation and wind power generation). Therefore, even if the power generated by the household power generator 104 fluctuates, it is possible to perform control so as to make the amount of power sent to the outside constant or discharge as necessary. For example, the power storage device 103 can be used in the following manner. The power obtained by photovoltaic power generation is stored in the power storage device 103. At night, low-rate midnight electric power is stored in the power storage device 103. The power stored in the power storage device 103 is discharged and used in the daytime which is the time zone during which the electricity rate is high.

It should be understood that although in this case, the description has been given with respect to the example in which the control device 110 is accommodated in the power storage device 103, the control device 110 may be accommodated in the smart meter 107 or may be configured independently. Furthermore, the power storage system 100 may be used for a plurality of homes in a housing complex, or may be used for a plurality of detached houses.

Figure 6:
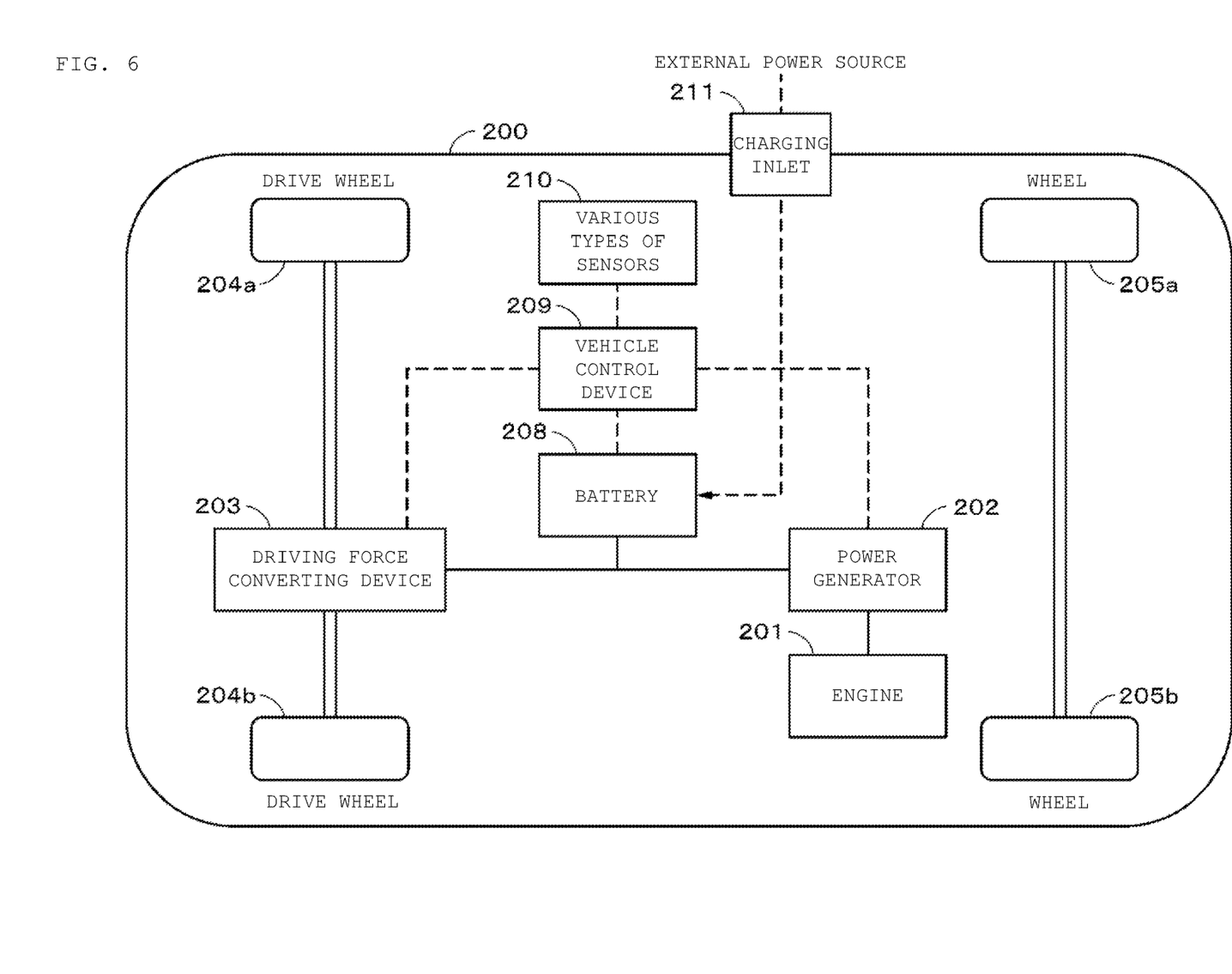
FIG. 6 is a block diagram of an application example of the power supply device according to another embodiment of the present technology.

An example according to another embodiment of the present technology is applied to a power storage system for a vehicle will be described with reference to FIG. 6. FIG. 6 schematically shows an example of the configuration of a hybrid vehicle adopting a series hybrid system to which the present technology is applied. The hybrid vehicle adopting a series hybrid system is a car which travels with a power driving force converting device by using the power generated by a power generator driven by an engine or the power temporarily stored in a battery.

A hybrid vehicle 200 is equipped with an engine 201, a power generator 202, a power driving force converting device 203, a drive wheel 204a, a drive wheel 204b, a wheel 205a, a wheel 205b, a battery 208, a vehicle control device 209, various types of sensors 210, a charging inlet 211. The battery 208 is used as the battery module in the power supply device according to the technology described above. That is, the battery 208 of the electrically powered vehicle is used as a household power supply device.

The hybrid vehicle 200 travels with the power driving force converting device 203 as a power source. An example of the power driving force converting device 203 is a motor. The power driving force converting device 203 is actuated by power from the battery 208, and the rotative force of the power driving force converting device 203 is transferred to the drive wheels 204a and 204b. Note that using direct current-alternating current (DC-AC) conversion or reverse conversion (AC-DC conversion) in a necessary portion makes it possible to apply either an AC motor or a DC motor to the power driving force converting device 203. The various types of sensors 210 control an engine speed via the vehicle control device 209, and control the aperture (throttle aperture) of a throttle valve (not shown). The various types of sensors 210 include a speed sensor, an acceleration sensor, and an engine speed sensor.

The rotative force of the engine 201 is transferred to the power generator 202. The power which is generated by the power generator 202 by using the rotative force can be stored in the battery 208.

When the hybrid vehicle is decelerated by a braking mechanism (not shown), a resistive force in the phase of deceleration is added as a rotative force to the power driving force converting device 203. The regenerative power generated by the power driving force converting device 203 using the rotative force is stored in the battery 208.

The battery 208 is connected to a power supply located outside the hybrid vehicle to receive the power supplied from the external power source through the charging inlet 211 as an input inlet, thereby making it possible to store the received power.

Although not shown, the hybrid vehicle may include an information processor for performing information processing concerning vehicle control based on information on a storage battery. Such an information processor, for example, includes an information processor for performing battery remaining capacity display based on information on the remaining capacity of the battery.

It should be understood that the above description has exemplified the series hybrid car which travels with the motor by using either the power generated by the power generator driven by the engine or the power obtained by temporarily storing the generated power in the battery. However, the present technology can also be effectively applied to a parallel-hybrid car which switches and uses as necessary three systems: traveling with only an engine; traveling with only a motor; and traveling with both of the engine and the motor, each using outputs from the engine and the motor as driving sources. In addition, the present technology can also be effectively applied to a so-called electrically powered vehicle which travels with the drive force generated by only a driving motor without using an engine.

The present technology is not limited to the embodiments described herein, and various modifications based on the technical idea of the present technology are possible.

The present technology is described below in further detail according to an embodiment.

(1)

A power supply device includes a photovoltaic power generator, a secondary battery unit, a charger configured to supply power from the photovoltaic power generator to the secondary battery unit, a DC-AC power conversion circuit unit configured to convert a discharge output of the secondary battery unit into AC power, and a control device configured to control charging of the secondary battery unit based on a load power prediction obtained by moving average of used power and an amount of power generated by the photovoltaic power generator and perform control to switch output of the amount of power generated by the photovoltaic power generator between the secondary battery unit and commercial system power based on an SOC of the secondary battery unit.

(2)

In the power supply device according to claim 1, the control device performs control in a range in which the SOC of the secondary battery unit is neither in a completely discharged state nor in a fully charged state.

(3)

In the power supply device according to (1), the moving average is calculated every predetermined time.

(4)

In the power supply device according to (1), (2) or (3), a proportion of output power from a secondary battery is increased when load power increases so as to greatly deviate from a load power prediction.

(5)

In the power supply device according to (4), when load power becomes not less than a maximum output value of the secondary battery unit, a purchased amount of system commercial power is increased and supplied to a load.

(6)

In the power supply device according to (4), when load power suddenly decreases so as to greatly deviate from a predicted value, control is performed to supply power by using only the secondary battery unit and stop purchasing power from system commercial power.

(7)

In the power supply device according to (1), (2), (3) or (4), the control device performs control such that the secondary battery unit is fully charged in evening.

(8)

In the power supply device according to (1), the control device compares a load power prediction value or load power with a threshold value slightly smaller than contracted electric power, and when the load power prediction value or the load power exceeds the threshold value and a remaining capacity of the secondary battery unit is not less than a predetermined amount, performs control such that an output from the secondary battery unit is changed to a maximum output value.

(9)

A control device configured to control charging of the secondary battery unit based on a load power prediction obtained by moving average of used power and an amount of power generated by the photovoltaic power generator, and perform control to switch output of the amount of power generated by the photovoltaic power generator between the secondary battery unit and commercial system power based on an SOC of the secondary battery unit.

(10)

The control device according to claim 9, configured to perform control in a range in which the SOC of the secondary battery unit is neither in a completely discharged state nor in a fully charged state.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A power supply device comprising;
   a photovoltaic power generator;
   a secondary battery unit;
   a charger configured to supply power from the photovoltaic power generator to the secondary battery unit;
   a DC-AC power conversion circuit configured to convert a discharge output of the secondary battery unit into AC power; and
   a control device configured to control charging of the secondary battery unit based on a load power prediction obtained by a moving average of used power and an amount of power generated by the photovoltaic power generator,
   wherein the control device is configured to control to switch output of the amount of power generated by the photovoltaic power generator between the secondary battery unit and a commercial system power based on a value of state of charge (SOC) of the secondary battery unit,
   wherein the control device is configured to increase a proportion of output power from the secondary battery unit when an actual load power exceeds the load power prediction,
   wherein when the actual load power suddenly decreases from the load power prediction, the control device is configured to supply power by using only the secondary battery unit and stop purchasing power from the commercial system power,
   wherein the control device is configured to compare the load power prediction value or load power with a threshold value, and when the load power prediction value or the load power exceeds the threshold value and a remaining capacity of the secondary battery unit is not less than a predetermined amount, the control device performs control to change an output from a limited value to a maximum output value of the secondary battery unit, and
   wherein the threshold value is a maximum demand electric power in a past year.

2. The power supply device according to claim 1, wherein the control device is configured to perform control in a range in which the secondary battery unit is neither in a completely discharged state nor in a fully charged state.

3. The power supply device according to claim 1, wherein the moving average is periodically calculated.

4. The power supply device according to claim 1, wherein when load power becomes not less than a maximum output value of the secondary battery unit, a purchase amount of system commercial power is increased and supplied to a load.

5. The power supply device according to claim 1, wherein the control device is configured to perform control to fully charge the secondary battery unit.

6. A control device, comprising:
   a processor,
   wherein the processor is configured to control charging of a secondary battery unit based on a load power prediction obtained by a moving average of used power and an amount of power generated by a photovoltaic power generator,
   wherein the processor is configured to perform control to switch output of the amount of power generated by the photovoltaic power generator between the secondary battery unit and a commercial system power based on a value of state of charge (SOC) of the secondary battery unit,
   wherein the processor is configured to increase a proportion of output power from the secondary battery unit when an actual load power exceeds the load power prediction,
   wherein when the actual load power suddenly decreases from the load power prediction, the processor is configured to supply power by using only the secondary battery unit and stop purchasing power from the commercial system power,
   wherein the control device is configured to compare the load power prediction value or load power with a threshold value, and when the load power prediction value or the load power exceeds the threshold value and a remaining capacity of the secondary battery unit is not less than a predetermined amount, the control device performs control to change an output from a limited value to a maximum output value of the secondary battery unit, and
   wherein the threshold value is a maximum demand electric power in a past year.

7. The control device according to claim 6, wherein the processor is configured to perform control in a range in which the secondary battery unit is neither in a completely discharged state nor in a fully charged state.

* * * * *